(12) United States Patent
McCann et al.

(10) Patent No.: US 11,930,079 B2
(45) Date of Patent: Mar. 12, 2024

(54) WIRELESS LOCAL AREA NETWORKS

(71) Applicant: MALIKIE INNOVATIONS LIMITED, Dublin (IE)

(72) Inventors: Stephen McCann, Southampton (GB); Michael Peter Montemurro, Toronto (CA); James Randolph Winter Lepp, Ottawa (CA)

(73) Assignee: Malikie Innovations Limited, Dublin (IE)

( * ) Notice: Subject to any disclaimer, the term of this patent is extended or adjusted under 35 U.S.C. 154(b) by 0 days.

(21) Appl. No.: 18/154,547

(22) Filed: Jan. 13, 2023

(65) Prior Publication Data

US 2023/0156087 A1    May 18, 2023

Related U.S. Application Data

(63) Continuation of application No. 17/185,541, filed on Feb. 25, 2021, now Pat. No. 11,570,251, which is a continuation of application No. 15/969,956, filed on May 3, 2018, now Pat. No. 10,965,757.

(51) Int. Cl.
*H04L 67/12* (2022.01)
*H04W 12/04* (2021.01)
*H04W 52/02* (2009.01)
*H04W 84/12* (2009.01)

(52) U.S. Cl.
CPC ............. *H04L 67/12* (2013.01); *H04W 12/04* (2013.01); *H04W 52/0203* (2013.01); *H04W 84/12* (2013.01)

(58) Field of Classification Search
None
See application file for complete search history.

(56) References Cited

U.S. PATENT DOCUMENTS

| 6,484,082 B1 | 11/2002 | Millsap et al. |
| 6,611,724 B1 | 8/2003 | Buda |
| 10,965,757 B2 | 3/2021 | McCann |
| 2006/0220805 A1 | 10/2006 | Thomas |
| 2007/0260906 A1 | 11/2007 | Corredoura |
| 2008/0195879 A1 | 8/2008 | Asmi |
| 2010/0149968 A1 | 6/2010 | Reinold et al. |
| 2011/0193721 A1 | 8/2011 | Koie |
| 2012/0224481 A1 | 9/2012 | Babiarz |

(Continued)

FOREIGN PATENT DOCUMENTS

| EP | 1544995 A1 | 6/2005 |
| EP | 2988467 A1 | 2/2016 |

OTHER PUBLICATIONS

Wikipedia, Electronic control unit last edited Apr. 29, 2018 (4 pages).

(Continued)

*Primary Examiner* — Alex Skripnikov
(74) *Attorney, Agent, or Firm* — Botos Churchill IP Law LLP (57) ABSTRACT

In some examples, a system includes a plurality of network controllers, a WI-FI wireless local area network (WLAN) over which at least a first network controller and a second network controller of the plurality of network controllers are to communicate, wherein a link between the first network controller and the second network controller through the WI-FI WLAN is a synchronized link.

20 Claims, 3 Drawing Sheets

(56) References Cited

U.S. PATENT DOCUMENTS

| | | | |
|---|---|---|---|
| 2012/0327851 A1* | 12/2012 | Wentink | H04W 76/14 370/328 |
| 2013/0054863 A1 | 2/2013 | Imes | |
| 2016/0241541 A1 | 8/2016 | Soelberg | |
| 2016/0261430 A1 | 9/2016 | Lepp et al. | |
| 2019/0064408 A1 | 2/2019 | Smit | |

OTHER PUBLICATIONS

Dudu et al., In-Vehicle Automotive Network Gateway Electronic Control Unit for Low Price Vehicle, SASTECH, vol. 8, Issue 2, Sep. 2009 (8 pages).
Steve Carlson, Technologies—IOT, Ethernet Standard Opens the Door to Advanced Connected-Car Design, Jun. 21, 2016 (29 pages).
David Law, IEEE, P802.3bw, Type of Project: Amendment to IEEE Standard 802.3-2012, PAR Request Date: May 29, 2014 (2 pages).
David Law, IEEE, P802.3ch, Type of Project: Amendment to IEEE Standard 802.3-2015, PAR Request Date: Mar. 17, 2017 (2 pages).
Wienckowski, Natalie A., ECU Start-Up Requirements, May 2017 (9 pages).
Bheile, P802.15.xx, Type of Project: New IEEE Standard, PAR Request Date: Sep. 10, 2017 (3 pages).
Evgeny Khorov, PowerPoint Presentation, IEEE 802.11-17-1734-00-0wng, Wi-Fi Time Sensitive Networking, Nov. 2017 (10 pages).
IEEE Standard for Ethernet Amendment 1: Physical Layer Specifications and Management Parameters for 100 Mb/s Operation over a Single Balanced Twisted Pair Cable (100BASE-T1) IEEE Std 802.3bw™-2015 (Amendment to IEEE Std 802.3™-2015) (88 pages).
IEEE Standard for Information technology—Telecommunications and information exchange between systems Local and metropolitan area networks—Specific requirements, Part 11: Wireless LAN Medium Access Control (MAC) and Physical Layer (PHY) Specifications Amendment 4: Enhancements for Very High Throughput for Operation in Bands below 6 Ghz, IEEE Std 802.11ac™-2013 (425 pages).
IEEE Standard for Information technology—Telecommunications and information exchange between systems Local and metropolitan area networks—Specific requirements, Part 11: Wireless LAN Medium Access Control (MAC) and Physical Layer (PHY) Specifications Amendment 3: Enhancements for Very High Throughput in the 60 GHz Band, IEEE Std 802.11ad™-2012 (628 pages).
IEEE Standard for Low-Rate Wireless Networks, IEEE Std 802.15.4™-2015, Approved Dec. 5, 2015 (708 pages).
P802.1AS-Rev/D7.0, IEEE P802.1AS-Rev/D7.0, Draft Standard for Local and Metropolitan Area Networks—Timing and Synchronization for Time-Sensitive Applications, Mar. 29, 2018 (496 pages).
Wikipedia, Bluetooth edited on May 3, 2018 (28 pages).
Draft Standard for Information Technology—Telecommunications and information exchange between systems, Local and metropolitan area networks—Specific requirements, Part 11: Wireless LAN Medium Access Control (MAC) and Physical Layer (PHY) specifications, Amendment 3: Enhancements for Very High Throughput to Support Chinese Millimeter Wave Frequency Bands (60 GHz and 45 Ghz), IEEE P802.11aj/D9.0, Nov. 2017 (316 pages).
IEEE P802.11ax™/D2.2, Draft Standard for Information technology—Telecommunications and information exchange between systems Local and metropolitan area networks—Specific requirements, Part 11: Wireless LAN Medium Access Control, (MAC) and Physical Layer (PHY) Specifications, Amendment 6: Enhancements for High Efficiency WLAN, IEEE P802.11ax™/D2.2, Feb. 2018 (620 pages).
P802.11ay™/D1.2, Draft Standard for Information Technology—Telecommunications and Information Exchange, Between Systems—Local and Metropolitan Area Networks—Specific Requirements—Part 11: Wireless LAN Medium Access Control (MAC) and Physical Layer (PHY) Specifications—Amendment 7: Enhanced throughput for operation in license-exempt bands above 45 Ghz, IEEE P802.11ay™/D1.2, Apr. 2018 (581 pages).
IEEE P802.3ch Multigigabit Automotive Ethernet PHY Task Force Ad Hoc Area, Last Update: May 2, 2018 (3 pages).
IEEE Standard for Information technology—Telecommunications and information exchange between systems, Local and metropolitan area networks—Specific requirements, Part 11: Wireless LAN Medium Access Control (MAC) and Physical Layer (PHY) Specifications, IEEE Std 802.11™-2012, Mar. 29, 2012 (2793 pages).
Talbot et al., Comparison of FieldBus Systems, CAN, TTCAN, FlexRay and LIN in Passenger Vehicles, Jun. 2009 (6 pages).
Dipl. Ing. (FH) Bernd Jesse, Time Synchronization in Automotive Ethernet Networks Balancing Act Between Autosar, IEEE, and TSN, Technical Article, Aug. 2016 (5 pages).
Han et al., On Authentication in a Connected Vehicle: Secure Integration of Mobile Devices with Vehicular Networks, Apr. 11, 2013 (10 pages).
Lee et al., Performance of WLAN 802.11B Standard at In-Vehicle Environment, 2006 6th International Conferenec on ITS Telecommunciations, Jun. 23, 2006, retrieved on Jun. 11, 2019 (4 pages).
Wei et al., RT-WiFi: Real-Time High-Speed Communication Protocol for Wireless Cyber-Physical Control Applications, 2013 IEEE 34th Real-Time Systems Symposium, Dec. 6, 2013, retrieved on Jun. 11, 2019 (10 pages).
Canadian Intellectual Property Office ISA/CA, International Search Report and Written Opinion for PCT/CA2019/050521 dated Jun. 19, 2019 (10 pages).
European Patent Office, Extended European Search Report for Appl. No. 19796838.1 dated Feb. 10, 2021 (13 pages).
Thomas D. Lagkas, Georgios I. Papadimitriou, Senior Member, IEEE, Petros Nicopolitidis, and Andreas S. Pomportsis, Priority-Oriented Adaptive Control With QoS Guarantee for Wireless LANs, IEEE Transactions on Vehicular Technology, vol. 56, No. 4, Jul. 2007 (Year: 2007) (12 pages).
Chinese First Office Action issued in corresponding CN application No. 201980027021.3 dated Jun. 29, 2023, pp. 11.
Office Action for Canadian Patent Application No. 3,092,896, dated Oct. 13, 2023, 4 Pages.
Office Action and Search Report in Chinese Patent Application No. 2019800270213, dated Jun. 29, 2023, 17 pages.
Extended European Search Report for European Patent Application No. 23156514.4, dated Jul. 5, 2023, 10 Pages.
Gallagher, B. et al., "Wireless Communications for Vehicle Safety: Radio Link Performance & Wireless Connectivity Methods", IEEE, Vehicular Technology Magazine, Dec. 2006, 14 Pages.
Lee, S. et al., "Performance of WLAN 802.11B Standard at In-Vehicle Environment", 2006 6th International Conference on ITS Telecommunications Proceedings, 2006, pp. 1110-1113.

\* cited by examiner

WIRELESS LOCAL AREA NETWORKS

CROSS-REFERENCE TO RELATED APPLICATION

This is a continuation of U.S. application Ser. No. 17/185,541, filed Feb. 25, 2021, U.S. Pat. No. 11,570,251, which is a continuation of U.S. application Ser. No. 15/969,956, filed May 3, 2018, U.S. Pat. No. 10,965,757, which are hereby incorporated by reference.

BACKGROUND

In a vehicle, an electronic control unit (ECU) can refer to an embedded system that controls one or more subsystems in the vehicle. Traditionally, ECUs are connected using wired connectors with data communications performed over a field bus. A vehicle can potentially include a large number of ECUs.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A vehicle can refer to any type of transport structure to carry cargo and/or people between different physical locations. Examples of vehicles include any or some combination of the following: a car, a truck, a watercraft (e.g., a boat, a yacht, a ship, etc.), an aircraft, a spacecraft, a railed vehicle (e.g., a train), a cargo transportation unit (e.g., a container, a trailer, a platform, etc.), and so forth.

Examples of electronic control units (ECUs) that can be included in a vehicle include any or some combination of the following: an engine control module (ECM) for controlling the vehicle's engine, a powertrain control module (PCM) to control the vehicle's powertrain, a transmission control module (TCM) to control the vehicle's transmission, a brake control module (BCM or EBCM) to control the vehicle's brake subsystem, a central control module (CCM) to control specified functionalities of the vehicle, a central timing module (CTM) to control timings of subsystems in the vehicle, a general electronic module (GEM) to control the vehicle's electrical subsystem, a body control module (BCM) to control the vehicle's stabilization subsystem, a suspension control module (SCM) to control the vehicle's suspension subsystem, a door control unit to control the vehicle's doors, a power steering control unit to control the vehicle's power steering subsystem, a seat control unit to control the vehicle's power seats, a speed control unit to control the vehicle's speed, a battery management system to manage batteries in the vehicle, a human-machine interface (HMI) to provide an interface through which a human can interact with the vehicle, and so forth.

In some examples, field buses are used to interconnect the ECUs. Examples of field buses include a Local Interconnect Network (LIN) bus, a Controller Area Network (CAN) bus, a FlexRay bus, a Time-Triggered Protocol (TTP) bus, a ZigBee bus, or others.

A network in a vehicle has to have certain characteristics for reliable performance of the vehicle, including low latency (or bounded latency) and high reliability of data delivery in a timely manner. Certain ECUs of a vehicle are safety related, such as ECUs that control the brake subsystem, engine, power steering, transmission, and other critical subsystems of the vehicle. If data is not timely communicated over the vehicle's network to ECUs that control safety-related subsystems, then loss of control of the vehicle may occur leading to accidents.

In addition to low latency and high reliability, the network of a vehicle should also provide security (to reduce the likelihood of a hacker attacking the subsystems of the vehicle), redundancy to protect against failures of a portion of the network, a reduced communication range to prevent being compromised by a hacker, and other features (discussed further below).

Figure 1:
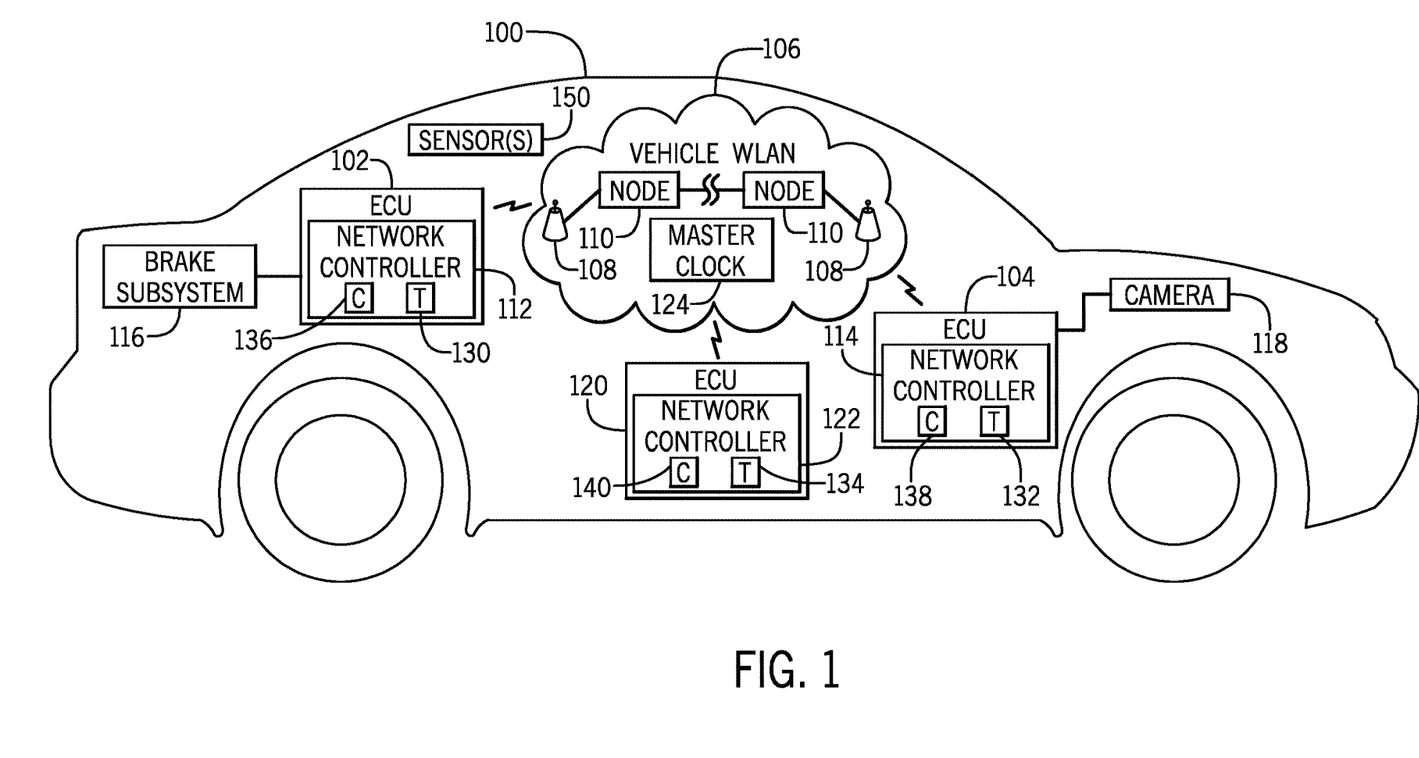
FIG. 1 is a block diagram of a vehicle that includes ECUs and network controllers of the ECUs that are interconnected by a vehicle wireless local area network, according to some examples.

FIG. 1 is a block diagram of a vehicle 100 that includes a vehicle wireless local area network (WLAN) 106 to which various ECUs 102, 104, and 120 are wirelessly coupled. Although three ECUs are depicted in FIG. 1, it is noted that the vehicle 100 can include less than or more than three ECUs in other examples.

The vehicle WLAN 106 can be a WI-FI WLAN (or more simply, a "WI-FI network") that includes wireless access points (APs) 108 to which the ECUs 102, 104, and 120 are able to wirelessly connect. An AP refers to a networking device with which a wireless device can associate to perform data communications over a wireless link between the wireless device and the AP. Communications in a WI-FI network can be according to the Institute of Electrical and Electronic Engineers (IEEE) 802.11 standards.

In some examples, the WI-FI network can be a high frequency, high throughput network, such as according to the IEEE 802.11ay (Next Generation 60 GHz) standard, the IEEE 802.11ad standard (Microwave WI-FI/WiGig), the IEEE 802.11aj (Very High Throughput to Support Chinese Millimeter Wave Frequency Bands (60 GHz and 45 GHz)) standard, and so forth. As used here, a "high frequency" WI-FI network is able to operate using a carrier at a frequency that is greater than or equal to 10 Gigahertz (GHz), in some examples. A "high throughput" WI-FI network is able to transmit data at greater than a specified data rate, for example 10 megabits per second (Mbps).

Alternatively, a WI-FI network can also operate using light signals to communicate data wirelessly as a high frequency, high throughput network. The IEEE 802.11bb (Light Communication) group of IEEE 802.11 is developing a proposal for light communications in WI-FI networks.

The use of the IEEE 802.11ay, 802.11aj, and 802.11bb technologies can provide wireless connections with low levels of interference (and therefore congestion). In the case of light communications, the light can be fairly directional, and interference can be mitigated by any opaque object, i.e., light does not usually pass through walls to interfere with another network. In the case of IEEE 802.11ay and IEEE 802.11aj (60 GHz), signals are sent at low power and with directional antennas. As a result of directional transmissions and propagation characteristics of the 60 GHz carrier frequency, interference from nearby networks can be reduced.

The high throughput capabilities, together with other new features, of the foregoing technologies for implementing the WI-FI network 106 enable low latency and deterministic behavior to be provided for vehicle applications. This is a departure from traditional 802.11 WLAN, where latency and non-deterministic behavior have prevented 802.11 WLAN from being used for time sensitive applications.

In some examples, the APs 108 of the WI-FI network 106 are connected to network nodes 110 of the vehicle LAN 106. The network nodes 110 can include switches, routers, bridges, gateways, and so forth. The network nodes 110 are used to transport data between APs 108, and also between an AP and another destination, which can be off the vehicle 100. In other examples, the network nodes 110 can be omitted, and the APs 108 can be connected to one another.

Each ECU 102, 104, or 120 includes or is connected to a corresponding network controller. For example, the ECU 102 is associated with a network controller 112, the ECU 104 is associated with a network controller 114, and the ECU 120 is associated with a network controller 122. A "network controller" can refer to a device (e.g., an integrated circuit chip, an electronic device, etc.) that can be used for performing communications over the WI-FI network 106. The network controller can be implemented using a hardware processing circuit, which can include any or some combination of the following: a microprocessor, a core of a multi-core microprocessor, a microcontroller, a programmable integrated circuit device, a programmable gate array, or any other hardware processing circuit. Alternatively, the network controller can be implemented as a combination of a hardware processing circuit and machine-readable instructions (software and/or firmware) executable on the hardware processing circuit.

In the ensuing discussion, it is assumed that the network controller 112 is included in the ECU 102, the network controller 114 is included in the ECU 104, and the network controller 122 is included in the ECU 120. In alternative examples, the network controller 112, 114, and/or 122 can be separate from, but connected to, the corresponding ECU 102, 104, and/or 120.

The example ECU 102 is used to control a brake subsystem 116 of the vehicle 100. The example ECU 104 is used to control a camera 118 of the vehicle 100. The example ECU 120 is used to control another subsystem (not shown).

Use of the WI-FI network 106 (even over short distances in the vehicle 100) can provide cost savings in vehicle manufacturing, installation, and maintenance, for example due to the elimination of a conventional wiring loom and the labor costs associated with its installation. For example, by using the WI-FI network 106, cables that interconnect (some) ECUs can be omitted.

For longer communication paths in a vehicle, the path can be designed using prisms, lenses, mirrors, and various forms of reflectors. Light beams used for data communications can be narrow or wide, depending on the optical transducers used and the specified levels of physical isolation. Correspondingly millimetric beams used for data communications can also be narrow or wide depending on the transducers and isolation of the system.

In some examples, each ECU can act as an IEEE 802.11 station (e.g., each ECU has an IEEE 802.11 communications chip, in the form of a respective network controller within it) and connects to an IEEE 802.11 AP, which in turn is connected to the network through a bridge or switch.

It is noted that the wireless connections form an automobile WLAN and are not operating as individual point-to-point links in a star and hub configuration. Therefore, traffic from the camera 118 can flow directly to another ECU (e.g., 120), through the WI-FI network 106.

In some examples, an automobile regulatory requirement may specify that a rear-view camera has to turn on and be streaming video to a display screen within 2 seconds (or other time duration) of power on. This can be achieved using either of the following techniques, in some examples.

(1) An Optimized Connectivity Experience (OCE) WLAN solution provided by the WI-FI Alliance. OCE is based on IEEE 802.11ai allowing faster and optimized connection set up times.

(2) The camera in an IEEE 802.11 network can be operated in a power save mode, and when the camera is awakened, a trigger message according to IEEE 802.11ba (Wake Up Radio) can inform the ECU 104 that a video session is available. This trigger then awakens the network controller of the ECU 104 from a lower power state to a higher power state.

In addition, other devices can also be connected to the ECU 104, so that a link can include several combined data feeds from one area of the vehicle 100 to another area of the vehicle 100.

Synchronized Link

A link can be established between network controllers through the WI-FI network 106. A "link" refers to a logical connection through the WI-FI network 106 between network controllers. In accordance with some implementations of the present disclosure, the link between network controllers is a synchronized link. A synchronized link is a link that couples multiple devices having clocks (discussed further below) that are synchronized with respect to one another. Note that a first network controller can maintain a synchronized link with multiple other network controllers.

As further shown in FIG. 1, the network controller 112 includes a wireless transceiver 130, the network controller 114 includes a transceiver 132, and the network controller 122 includes a transceiver 134. A transceiver includes a transmitter and a receiver to transmit and receive, respectively, signals. In examples according to FIG. 1, the transceivers 130, 132, and 134 are wireless transceivers that are able to communicate wireless signals.

In addition, the network controllers 112, 114, and 122 include respective clocks 136, 138, and 140. A "clock" refers to a device that produces an oscillating signal that controls the timing of circuitry. Network controllers are synchronized to one another if their respective clocks are synchronized, i.e., transition edges of the clocks are aligned in time (to within some specified tolerance) with respect to one another.

In some examples, the WI-FI network 106 can include a master clock 124. The other clocks (e.g., 136, 138, and 140) in the vehicle 100 can be synchronized to the master clock 124. The master clock 124 can be included in a network node, such as in a switch or other type of network node. Alternatively, the master clock 124 can be included in an ECU that is designated a central ECU (e.g., the ECU 120) or an ECU that is designated as a master clock ECU.

The master clock 124 can be internally generated in the vehicle 100, such as based on an oscillator in the vehicle 100. Alternatively, the master clock 124 can be generated based on information from an external source, such as from GNSS (Global Navigation Satellite System) satellites, an atomic clock, and so forth.

In some examples, synchronization of the timings of the clocks in the vehicle 100 can be according to the IEEE 802.1AS standard (also referred to as "Generalized Precision Time Protocol").

In other examples, synchronization of the timings of the clocks in the vehicle 100 can employ different techniques.

Synchronizing the clocks of the network controllers allows for operations of the ECUs to be time-aligned with one another, such as to provide consistent transmission delays among the ECUs.

Real-Time Access Class

In accordance with some implementations of the present disclosure, a real-time access class (or multiple real-time access classes) can be defined for communicating data over the WI-FI network 106 of the vehicle 100.

IEEE 802.11 allows for the definition of access classes to distinguish different types of traffic to be communicated over a WI-FI network. An access class can also define medium access rules for transmission. A real-time access class (referred to as AC_RT) according to some implementations of the present disclosure can be associated with time-sensitive data to be communicated over the WI-FI network 106. The real-time access class is associated with a real-time WLAN bearer used to carry traffic of the real-time access class.

It is noted that traffic can dynamically switch among different access classes, which can be set during the provisioning of the WI-FI network 106.

Figure 2:
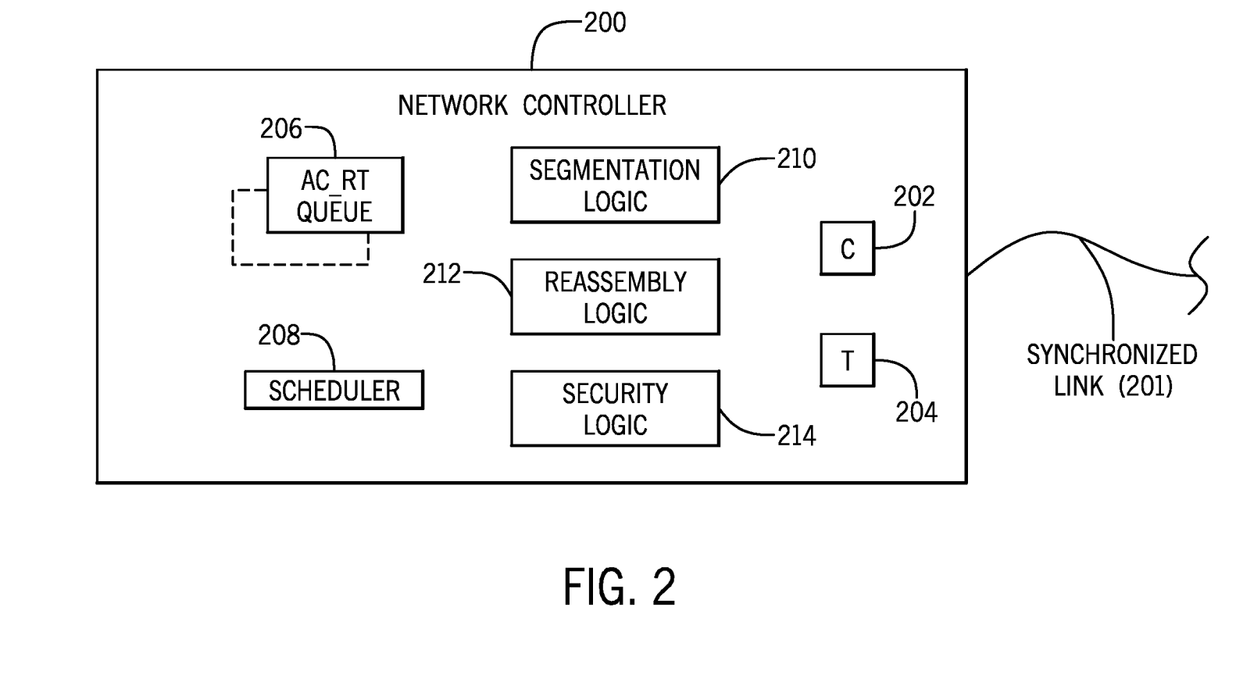
FIG. 2 is a block diagram of a network controller according to some examples.

FIG. 2 shows an example network controller 200, which can be any of the network controllers 112, 114, and 122 of FIG. 1. The network controller 200 includes a clock 202 and a transceiver 204, similar to those discussed in connection with FIG. 1.

In addition, the network controller 200 can include an AC_RT queue 206 to buffer data according to the real-time access class. Different queues (not shown) can be provided for other access classes in the network controller 200. The buffered data in the AC_RT queue 206 can be communicated over a synchronized link 201 through the WI-FI network 106 between network controllers.

In some examples, the synchronized link 201 over which data of the AC_RT queue 206 is communicated, may be independent of or separate from other logical links used to carry data of other access classes. This is to prevent synchronous traffic (according to the real-time access class) from being mixed with asynchronous traffic (e.g., according to the legacy access classes, AC_VI, AC_VO, etc.) on the same logical link.

In other examples, if the bandwidth and timing capabilities of the WI-FI network 106 that uses high frequency, high throughput technologies are sufficient, then the AC_RT traffic and legacy AC traffic may share the same link, but the WI-FI network 106 that uses high frequency, high throughput technologies would have to be carefully managed to ensure that the AC_RT traffic maintains its target operational envelope (e.g., if interference becomes an issue, non-AC_RT traffic may have to be discarded or buffered).

In further examples with multiple real-time access classes, the network controller 200 can include multiple respective AC_RT queues 206.

In examples where multiple real-time access classes are defined, IEEE 802.1Qbv provides a time-aware scheduler 208 so that traffic of different real-time access classes may be carried over one logical link. For example, different real-time access classes (e.g., AC_RT0, AC_RT1) may be mapped to respective different priorities, such as the priorities of the IEEE 802.1 Time Sensitive Networking (TSN) technology. The different priorities allows the scheduler 208 to select buffered data from multiple AC_RT queues 206 for transmission over the synchronized link.

More generally, the network controller 200 can be configured with media access parameters to allow the network controller 200 to transmit data according to a real-time access class over the synchronized link 201.

Latency

The network controller 200 further includes a segmentation logic 210 and a reassembly logic 212. The segmentation logic 210 divides data in the AC_RT queue 206 into packets (also referred to as protocol data units or PDUs) of a specified size (segmentation size). The divided data can be transmitted by the network controller 200 in respective packets having the segmentation size. Data in received packets (as received by the network controller 200) can be reassembled by the reassembly logic 212.

If lower latency is desired, the segmentation size can be reduced. On the other hand, if higher latency can be tolerated, then the segmentation size can be increased.

In some examples, segmentation and reassembly performed by the segmentation logic 210 and the reassembly logic 212 can be according to IEEE 802.11ay, 802.11aj or 802.11bb. In other examples, other segmentation and reassembly techniques can be employed.

Security

In some examples, an IEEE 802.11 security scheme (e.g., WI-FI Protected Access II or WPA2 or any IEEE 802.11 protocol configured to use Robust Security Network (RSN)) can be implemented using a security logic 214 in the network controller 200, where the security scheme can provide a higher level of security over a link than that of many wired technologies.

Each ECU (or other device) that connects to the WI-FI network 106 employs a security protocol and credentials (e.g., a password, a key, etc.) to connect to that WI-FI network 106. The security protocol can either be standards based or proprietary.

It is possible that a single WI-FI network 106 utilizes several security protocols at the same time, again with the assumption that an authentication server can also support the multiple security protocols.

A device (any of network nodes 110, for example) on the WI-FI network 106 can act as an authentication server (possibly co-located with one of the primary ECUs), so that ECUs and devices connecting to and disconnecting from the WI-FI network 106 can be managed. The authentication server can also authenticate the network controllers in the ECUs. In further examples, mechanisms such WI-FI Alliance Device Provisioning Protocol (DPP) Network Introduction, or a Fast Initial Link Setup (FILS) Public Key (defined in IEEE 802.11ai) can be used to allow ECUs to authenticate over a WLAN. Devices can be provisioned with a public key/private key pair signed by a Certificate Authority (CA) trusted by the vehicle to perform authentication. In further examples, devices can also be provisioned with a passphrase that can allow them to authenticate.

Provisioning

A new ECU (or other device, such as a network controller) placed in the vehicle 100 can be provisioned by a provisioning server (e.g., any of network nodes 110) with requirements or parameters to operate over the WI-FI network 106. Provisioning can be achieved in many ways, using protocols such as DPP. This can be achieved at the time of assembly of the device or ECU, or when a device or ECU is added to the vehicle 100. Alternatively, a device or ECU can be provisioned remotely, such as over a cellular or other wireless link.

Each ECU (or other device) that joins the vehicle's WI-FI network 106 can be associated with a profile that is provisioned and configured for the WI-FI network 106. In some examples, a profile can include information relating to transmission power, network bandwidth use, support for a Medium Access Control (MAC) protocol, and so forth. The profile can also include information relating to an operation of the ECU or other device. For example, for a camera, the profile can specify an image resolution.

An out-of-band technique (such as DPP) can be used to provision the profile with the ECU (or other device). After the ECU (or other device) is provisioned with the profile, the ECU (or other device) after starting (e.g., powering up, resetting, etc.) is correctly configured to connect to the WI-FI network 106. Once an ECU (or device) is provisioned, it can set up a secure connection to the WI-FI network 106.

There are also other ways of provisioning ECUs (or other devices), for example, using a manual technique or connecting an ECU (or other device) to an external network (e.g., in a garage or manufacturing plant).

Power Saving

Power savings can be implemented in the ECUs (or other devices) on the WI-FI network 106. Since a wireless technology is used, the ECUs (or other devices) can be battery powered (or powered by other alternative power sources). IEEE 802.11 power saving schemes can be used in some examples.

In other examples, the vehicle 100 itself can provide environmental inputs. For example, when the vehicle 100 is stationary, signals from on-board sensor(s) 150 can indicate to ECUs (or other devices, such as network controllers) that they can remain in a low power state until the vehicle 100 starts to move again. Such power save information can be transmitted through a power network/bus, using a scheme such as the wake-up radio defined by IEEE 802.11ba or by another method.

A network controller within a first ECU can be powered off when the vehicle 100 is powered off, and a network controller within a second ECU can be powered on when the vehicle 100 is powered off.

Discovery

When an ECU (or device) is either added or removed from the vehicle's WI-FI network 106, a discovery process may be performed. The discovery process can be performed in response to any of the following: 1) when all the ECUs are powered up (e.g., the vehicle 100 is powered up), 2) once the vehicle 100 is already powered up (and possibly moving), or 3) a system reset (or re-configuration).

The discovery process can operate according to high frequency, high throughput technology used by the WI-FI network 106, such as by using IEEE 802.11bb, in which light communication devices can find and discover other devices within their vicinity. Alternatively, the discovery process can be performed at a higher layer (e.g. using the IEEE 802.11 MAC layer to find/discovery devices that are physically connected to the WLAN, but require synchronization and packet level discovery).

A device in a vehicle can search for a service by a network identifier (e.g., SSID), or the device can search via a Service identifier or hash as specified in IEEE 802.11aq.

When a device is installed in a vehicle, there are several possible techniques for discovery and provisioning. First, at the time the device is installed in the vehicle, the device is provisioned with network information and credentials for the vehicle. Second, the vehicle is updated out of band with the device identity and credentials, which allow the device to connect to the vehicle when the device is installed. The device has its credentials installed at the factory. Third, the vehicle is provisioned with credentials using a root CA at manufacturing. The vehicle is provisioned with the root CA information. The vehicle validates the device credentials when the device tries to connect the first time. There may be some user interaction with the vehicle to confirm that the device is being added.

Vehicle manufacturers can decide whether the associations (i.e., WLAN sessions) are maintained between powering the vehicle 100 up and down. WLAN sessions (e.g., that include security keys and network addresses such as Internet Protocol (IP) or MAC addresses) can be maintained by regularly updating a cache in an ECU (or several ECUs), so that when the vehicle 100 is powered down, a saved state of the vehicle's configuration is stored for future use. At the time of power up, the saved state enables all wireless ECUs (or more specifically the network controllers in the ECUs) to quickly re-establish their WLAN sessions and possibly perform a quick integrity check (e.g., by sending ping or keep-alive packets over each link) before any data is transmitted.

The security association of each ECU (or other device) can be considered in two contexts. The first begins when the ECU (or other device) is added at the assembly plant, or added by a mechanic, and ends when the part is removed from the vehicle. The second is a session that exists when the ignition key is turned on and ends when the car is turned off.

Note though that some of the components may continue to run even when the vehicle 100 is off, and thus a certain portion of the WI-FI network 106 may have to remain powered continually. The continually powered components can include a central computing device that stores ECU/device profiles and credentials for the system. For example, an electric vehicle has a remote prestart function for the climate control feature, and some antitheft systems specify that various electronics/communications links to stay running continually.

All or most of the ECUs (or other devices) can be powered down. Similarly, a portion of the vehicle's WI-FI network 106 can be powered down (e.g., the APs, bridges, and switches).

The WI-FI network 106 may also support a cellular backhaul communications link for remote locking/unlocking of the vehicle 100, for supporting a find-my-car feature, for remotely starting or shutting off the vehicle 100, and so forth.

Legacy Field Buses

Figure 3:
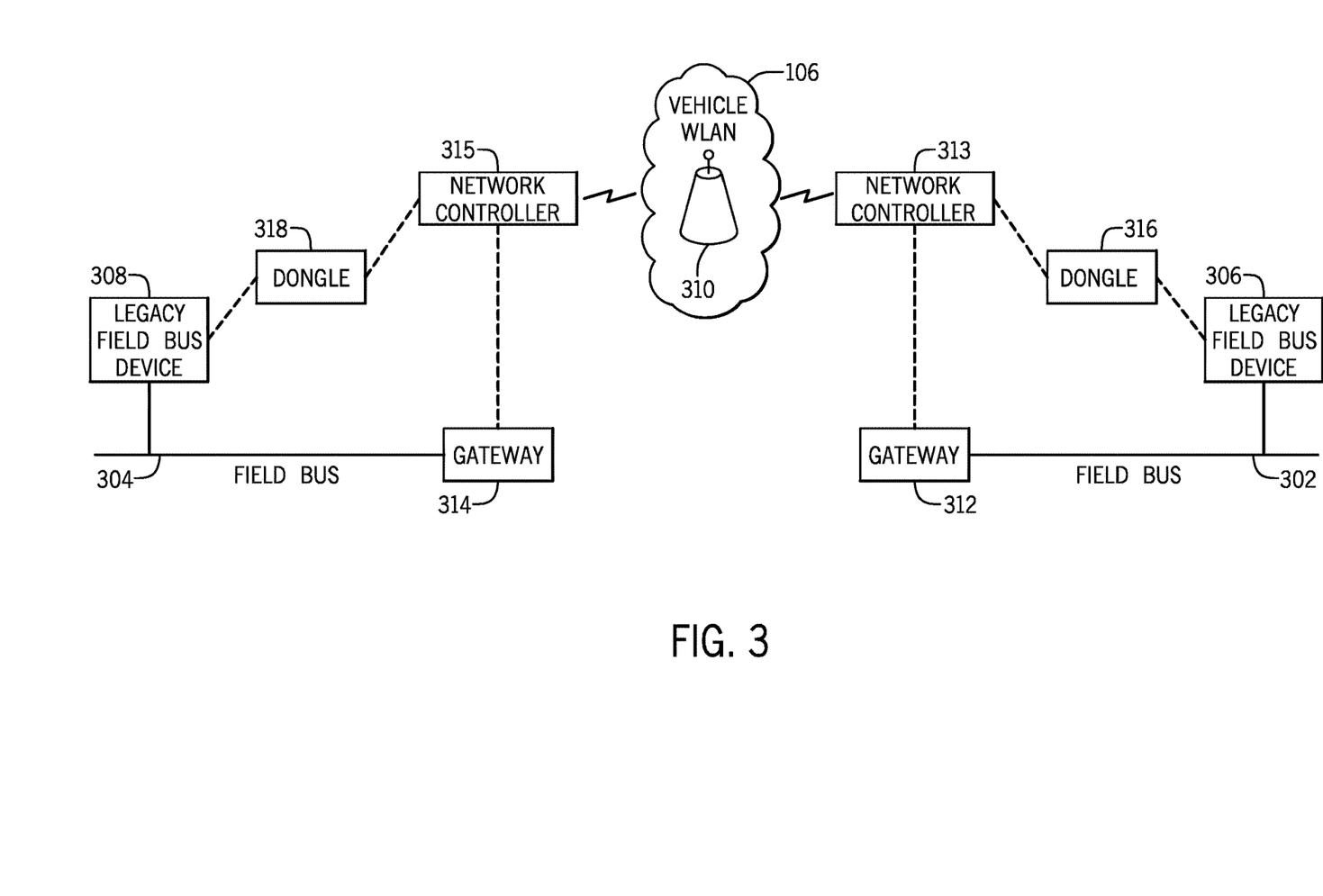
FIG. 3 is a block diagram of an example arrangement that includes a vehicle wireless local area network and field buses, according to further examples.

In addition to the WI-FI network 106, the vehicle 100 can also include legacy field buses. FIG. 3 shows an example that includes field buses 302 and 304 connected to respective legacy devices 306 and 308. Data on a field bus 302 or 304 can be transported by the WI-FI network 106 that includes an AP 310 as shown in FIG. 3.

Alternatively, the AP 310 can be omitted, so that a direct link can be established between network controllers 313 and 315 through the WI-FI network 106.

A data frame structure used on a field bus 302 or 304 can be carried in IEEE 802.11 data frames over the WI-FI network 106.

Gateways

In some examples, a gateway 312 or 314 can be used to encapsulate data, according to a field bus data format, into a frame according to an IEEE 802.11 data format. Each gateway 312 or 314 can include or be coupled to an IEEE 802.11 network controller 313 or 315, respectively, to communicate over the WI-FI network 106. In some examples, each gateway 312 or 314 can include or be coupled to a switch that connects into the respective field bus 302 or 304 using a suitable field bus connector.

Timing information (e.g. clock signals) may be copied from the field bus packets to serve as metadata or to assist with clock synchronization in the IEEE 802.11 backbone network.

The field bus packets are encapsulated into IEEE 802.11 frames by the gateway 312 or 314, using copies of the field bus addressing as metadata in the IEEE 802.11 backbone network. The IEEE 802.11 frames are then sent to their destinations, which can involve going through another gateway back to a field bus. In other examples, the IEEE 802.11 frames can be sent to a destination on the WI-FI network 106, so that the frames do not have to traverse through another gateway.

Each gateway 312 or 314 also allows a mix of legacy field bus devices and fieldbus-over-802.11 devices to be connected to the WI-FI network 106. The WI-FI network 106 is completely transparent to the legacy field bus devices.

Dongle

Instead of using a gateway 312 or 314, a dongle 316 or 318 can be used instead to communicate data of the legacy field bus device 306 or 308 over the WI-FI network 106. A dongle allows an IEEE 802.11 station (the network controller 313 or 315) to be directly connected to a single legacy field bus device and can connect into the existing field bus connector on that device. As a result, the legacy field bus device does not have to be connected to the field bus.

The dongle 316 or 318 performs conversion between field bus frames and IEEE 802.11 frames in similar manner as a gateway 312 or 314.

The dongle 316 or 318 can be separate from a respective field bus device, or alternatively, can be embedded into the field bus device. The embedded dongle can communicate over the WI-FI network 106, but not over a field bus.

A benefit of using an embedded dongle is that the field bus device 306 or 308 would no longer have to be provided with a physical field bus interface, thereby simplifying the field bus device 306 or 308.

Alternatively, a field bus device (306 or 308) can include a field bus interface as well as an embedded dongle.

Management

As noted above, a field bus device 306 or 308 connected to a respective field bus 302 or 304 does not know that its data is traversing anything other than the field bus. The IEEE 802.11 bridge (gateway or dongle) is transparent to the endpoints, including the field bus devices 306 and 308.

A field bus 302 or 304 can be an actual bus with multiple field bus devices, or implemented as a dongle (separate or embedded) for a single field bus device.

Assuming that the bandwidth and timing requirements of the WI-FI network 106 are sufficient to support field bus traffic, it is also possible that the same WI-FI network 106 can carry normal IEEE 802.11 traffic at the same time, subject to the legacy field bus traffic using different access classes.

System Architecture

FIG. 2 shows various components, including the scheduler 208, segmentation logic 210, reassembly logic 212, and security logic 214. These components can be implemented as hardware processing circuits, or as machine-readable instructions executable on a processor to perform tasks. A processor can include a microprocessor, a core of a multi-core microprocessor, a microcontroller, a programmable integrated circuit, a programmable gate array, or another hardware processing circuit. Machine-readable instructions executable on a processor can refer to the instructions executable on a single processor or the instructions executable on multiple processors.

A storage medium to store machine-readable instructions can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site (e.g., a cloud) from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A vehicle comprising:
a plurality of network controllers; and
a wireless local area network (WLAN) over which at least a first network controller and a second network controller of the plurality of network controllers are to communicate, the second network controller to store device profiles and credentials,
wherein a link between the first network controller and the second network controller through the WLAN is a synchronized link,
wherein the first network controller is to be powered off in response to the vehicle powering off, and the second network controller to store the device profiles and the credentials remains operational when the vehicle is powered off wherein the first network controller comprises a first clock to produce a first oscillating signal, and the second network controller comprises a second clock to produce a second oscillating signal, wherein the synchronized link is based on the second oscillating signal having transition edges that are aligned in time with transition edges of the first oscillating signal, and wherein the first network controller comprises a first clock to produce a first oscillating signal, and the second network controller comprises a second clock to produce a second oscillating signal having transition edges that are aligned in time with transition edges of the first oscillating signal.

2. The vehicle of claim 1, wherein the synchronized link is based on the second oscillating signal.

3. The vehicle of claim 2, wherein the first network controller is to maintain synchronized links with multiple network controllers of the plurality of network controllers, the first clock is a master clock, and the multiple network controllers comprise respective clocks synchronized to the master clock.

4. The vehicle of claim 1, wherein each of the first network controller and the second network controller comprises a respective queue to store data according to a real-time access class that is to be communicated between the first network controller and the second network controller over the synchronized link.

5. The vehicle of claim 1, wherein each of the first network controller and the second network controller comprises media access parameters to transmit data according to a real-time access class that is to be communicated between the first network controller and the second network controller over the synchronized link.

6. The vehicle of claim 1, wherein the synchronized link is to communicate data using a carrier having a frequency of greater than or equal to 10 gigahertz.

7. The vehicle of claim 1, wherein the synchronized link is to communicate data using light signals.

8. The vehicle of claim 1, wherein the first network controller and the second network controller are to communicate data over the synchronized link protected by a wireless security scheme.

9. The vehicle of claim 1, further comprising a device to send a trigger message to the first network controller to awaken the first network controller from a lower power state to a higher power state.

10. The vehicle of claim 1, further comprising an authentication server to authenticate network controllers of the plurality of network controllers.

11. The vehicle of claim 1, further comprising a provisioning server to provision a given network controller of the plurality of network controllers using a profile of the given network controller, in response to the given network controller joining the WLAN.

12. The vehicle of claim 1, further comprising a sensor to measure motion data associated with motion of the vehicle, and wherein the WLAN is to send the motion data or an indication based on the motion data to at least some of the plurality of network controllers to cause the at least some of the plurality of network controllers to enter a lower power state for power saving.

13. The vehicle of claim 1, wherein a given network controller of the plurality of network controllers is to save session information that is available across a power cycle of the given network controller, the given network controller to use the saved session information when powering up to establish a session represented by the saved session information.

14. The vehicle of claim 13, wherein the saved session information comprises a security key and a network address.

15. The vehicle of claim 1, further comprising:
a legacy device incapable of directly communicating over the WLAN; and
an intermediary device to encapsulate data of the legacy device in a data frame carried over the WLAN.

16. The vehicle of claim 15, further comprising a field bus to which the legacy device is connected, wherein the intermediary device comprises a gateway to connect the field bus to a network node of the WLAN, the gateway to encapsulate data of the field bus in the data frame carried over the WLAN.

17. The vehicle of claim 1, wherein a device profile of the device profiles comprises information selected from among a transmission power, or usage of a network bandwidth, or support for a Medium Access Control (MAC) protocol.

18. A method comprising:
communicating, by a plurality of network controllers in a vehicle, over one or more synchronized links of a wireless local area network (WLAN), wherein the plurality of network controllers comprise a first network controller and a second network controller, and wherein the first network controller comprises a first clock producing a first oscillating signal, and the second network controller comprises a second clock producing a second oscillating signal having transition edges that are aligned in time with transition edges of the first oscillating signal;
storing, in the second network controller, device profiles and credentials;
powering off the first network controller responsive to the vehicle powering off; and
maintaining the second network controller storing the device profiles and credentials operational when the vehicle is powered off.

19. The method of claim 18, wherein each of the first network controller and the second network controller comprises a respective queue to store data according to a real-time access class that is to be communicated between the first network controller and the second network controller over a synchronized link of the one or more synchronized links.

20. A non-transitory machine-readable storage medium storing instructions that upon execution cause a first network controller in a vehicle to:
communicate with a second network controller over a synchronized link of a wireless local area network (WLAN) in the vehicle,
wherein the communicating comprises exchanging data between the first and second network controllers that have clocks synchronized relative to one another, and wherein the first network controller comprises a first clock to produce a first oscillating signal, and the second network controller comprises a second clock to produce a second oscillating signal having transition edges that are aligned in time with transition edges of the first oscillating signal; and
store, in the first network controller, device profiles and credentials; and
maintain the first network controller storing the device profiles and credentials operational when the vehicle is powered off, wherein the second network controller is to be powered off in response to the vehicle powering off.

* * * * *